US005794164A

United States Patent [19]
Beckert et al.

[11] Patent Number: 5,794,164
[45] Date of Patent: Aug. 11, 1998

[54] VEHICLE COMPUTER SYSTEM

[75] Inventors: Richard D. Beckert, Lake Stevens; Mark M. Moeller, Des Moines; William Wong, Redmond, all of Wash.

[73] Assignee: Microsoft Corporation, Redmond, Wash.

[21] Appl. No.: 564,586

[22] Filed: Nov. 29, 1995

[51] Int. Cl.⁶ .................................................. G06F 19/00
[52] U.S. Cl. ................................................ 701/1; 701/36
[58] Field of Search ................. 364/424.045, 423.098; 455/345, 346; 701/36, 1

[56] References Cited

U.S. PATENT DOCUMENTS

| | | | |
|---|---|---|---|
| 4,194,585 | 3/1980 | Prince | 180/90 |
| 4,731,769 | 3/1988 | Schaefer et al. | 369/6 |
| 4,787,040 | 11/1988 | Ames et al. | 364/424.01 |
| 4,827,520 | 5/1989 | Zeinstra | 381/43 |
| 4,866,515 | 9/1989 | Tagawa et al. | 358/86 |
| 5,150,609 | 9/1992 | Ebner et al. | 73/117.3 |
| 5,289,378 | 2/1994 | Miller et al. | 364/424.04 |
| 5,313,200 | 5/1994 | Sone | 340/905 |
| 5,452,289 | 9/1995 | Sharma et al. | 370/32.1 |
| 5,455,823 | 10/1995 | Noreen et al. | 370/50 |
| 5,506,563 | 4/1996 | Jonic | 340/426 |
| 5,546,273 | 8/1996 | Harris | 361/697 |
| 5,555,172 | 9/1996 | Potter | 364/424.01 |
| 5,555,491 | 9/1996 | Tao | 361/686 |
| 5,555,502 | 9/1996 | Opel | 364/424.05 |
| 5,559,707 | 9/1996 | DeLorme et al. | 364/443 |
| 5,610,822 | 3/1997 | Murphy | 364/449.5 |
| 5,627,547 | 5/1997 | Ramaswamy et al. | 342/357 |
| 5,627,974 | 5/1997 | Watts, Jr. et al. | 395/281 |
| 5,629,626 | 5/1997 | Russell et al. | 324/345 |

FOREIGN PATENT DOCUMENTS

| | | |
|---|---|---|
| 4228605 | 3/1994 | Germany. |
| 2 120 424 | 11/1983 | United Kingdom. |

Primary Examiner—Michael Zanelli
Attorney, Agent, or Firm—Lee & Hayes, PLLC

[57] ABSTRACT

A vehicle computer system has a housing sized to be mounted in a vehicle dashboard or other appropriate location, a computer mounted within the housing, and an open platform operating system which executes on an open hardware architecture computer. The open platform operating system supports multiple different applications that can be supplied by a vehicle user. For instance, the operating system can support applications pertaining to entertainment, navigation, communications, security, diagnostics, and others. The computer has one or more storage drive (e.g., CD drive, floppy disk drive, cassette player, or hard disk drive) which permits the vehicle user to download programs from a storage medium (e.g., CD, diskette, cassette, or hard disk) to the computer. In the described implementation, the computer has two independent processors. One processor, which runs the operating system, is mounted in a stationary base unit of the housing and the other processor is mounted to a faceplate which is detachable from the base unit. When the faceplate is attached, the first processor provides the primary control over all operating systems (i.e., entertainment, navigation, communications, security, diagnostics, and others) and the faceplate processor is subservient. When the faceplate is detached, it forms a portable RF device with the faceplate processor providing radio and communications capabilities.

46 Claims, 7 Drawing Sheets

VEHICLE COMPUTER SYSTEM

TECHNICAL FIELD

This invention relates to computer systems for vehicles.

BACKGROUND OF THE INVENTION

Modern vehicles are typically equipped with several independent electronic systems. For instance, most modern vehicles have a sound system and a security system. The sound system usually consists of an AM/FM radio, a cassette or CD (compact disk) player, an equalizer/amplifier, and speakers. The radio and player are arranged in a metal casing or housing that is mounted in a dashboard of the vehicle. The housing has a standardized size, often expressed in terms of DINs (Deutsche Industry Normen), to ensure that the sound system is compatible with and can be retrofit into most vehicle dashboards.

The security system is entirely separate from the sound system. The security system generally consists of security sensors placed throughout the vehicle, and a central application-specific integrated circuit (ASIC) to monitor the sensors and determine whether security is being jeopardized. Security System also controls actuators to lock/unlock doors or windows, and an alarm or siren.

Most late model (1996 or later for OBD II, 1993 or later for OBD I) vehicles are also constructed with a diagnostic system that analyzes performance of the vehicle's engine, transmission and fuel system, and other components. The diagnostic system can be coupled to an external computer to download or monitor diagnostic information that is useful to a vehicle mechanic during servicing of the vehicle. Additionally, the diagnostic system might include dashboard displays that inform the driver of various operating conditions.

In some recent models, vehicles are being equipped with a navigation system that incorporates a global positioning system (GPS) receiver. The GPS receiver has an antenna to receive signals from a satellite network. The vehicle navigation system uses the satellite positioning signals to compute coordinates that locate the vehicle over the surface of the earth with regard to longitude, latitude, and altitude. Also, with the appropriate map software, the vehicle's location can then be shown on a map.

Cellular communications systems have also been added to vehicles. These communications systems enable the vehicle driver or occupant to transact telephone calls from their vehicle. Some of the more sophisticated systems are voice controlled which permit the driver to initiate or receive calls while traveling without removing a hand from the driving wheel, or diverting his/her eyes from the navigation of the vehicle.

While these various electronics systems have proven useful to vehicle users, there is a drawback in that the systems are unrelated and incompatible. Each system employs separate proprietary dedicated processors or ASICs which execute incompatible proprietary software. If a vehicle owner would like to add a security system to his/her vehicle, the owner must purchase an entire security system from one of the vendors and have it customarily installed. There is no way to add security functionality to an existing electronics system, such as the navigation system or the sound system.

SUMMARY OF THE INVENTION

This invention concerns a vehicle computer system that is capable of integrating these diverse and separate systems as well as offering a general purpose computing platform that allows for easy expandability. The vehicle computer system has a housing sized to be mounted in a vehicle dashboard. This system provides an open hardware architecture and supports an open platform operating system. The open platform operating system supports multiple different applications that can be supplied by a software vendor. For instance, the operating system can support applications pertaining to entertainment, navigation, communications, security, diagnostics, and others In the preferred implementation, the operating system is a multitasking operating system capable of concurrently running multiple applications. The computer has one or more storage devices (e.g., hard disk drive, CD drive, floppy disk drive, cassette player, or smart card reader) which permits the user to download programs from a storage medium (e.g., hard disk, CD, diskette, cassette, or smart card) to the computer. Also, the user can write data to writeable medium (e.g., hard disk, diskette, cassette, or smart card). In this manner, the vehicle owner can easily add new systems to his/her vehicle by installing additional programs.

In one implementation, the vehicle computer system has two independent processors. One processor (e.g., an Intel® based microprocessor) is provided on a computer module which mounts to a stationary base unit of the housing that resides in the vehicle dashboard or other location. The operating system runs on this processor to support the vehicle-related applications and to additionally provide all of the functionality typically afforded by a personal computer. Another processor (e.g., a digital signal processor) is provided on a faceplate module that detachably connects to the base unit. The faceplate module has an AM/FM tuner, display, keypad, and a CODEC which are controlled by the second processor. A third module, known as the support module, resides in the stationary base unit. The support module contains a storage drive (which also functions as an entertainment player), power supply, multimedia audio driver for the entertainment system, and a communications bus.

The three modules operate cooperatively, or independently, of one another except that the support module can not operate by itself. The faceplate module can be detached from the base unit and operate independently as a portable radio with mono-audio sound. By use of the CODEC with built in speaker and microphone, the faceplate module can further function as a portable phone or a handset unit that can communicate with the base unit in the vehicle. The portable faceplate module can also be used to receive paging information, take voice notes, and to remotely operate the security system. While detached, the faceplate module is powered by an independent source, such as batteries.

The faceplate module and support module can operate independently of the computer module. The faceplate module is physically connected to the front of the base unit and electronically interfaced with the support module. When connected and the computer module is not connected, the faceplate module totally controls the entertainment system of the vehicle. The faceplate processor controls the multimedia audio driver and the CD player in the support module. The faceplate module derives its power from the vehicle batteries via the power supply in the faceplate module.

When the computer module is also present, the faceplate module is controlled as a hot pluggable peripheral device. The processor on the computer module has full control of the communications bus and is master to the faceplate processor. The computer module processor controls systems not contained in the faceplate and can indirectly control resources contained in the faceplate. Also, the faceplate module processor lends signal processing resources to enhance the entertainment services and directly controls the resources contained in the faceplate.

The modular computer system affords tremendous flexibility when installing the system in a vehicle. As a low cost base model, the support module and faceplate module are installed in place of the conventional sound system. The housing is sized to the standard DIN form factor, so that the low cost base model can be substituted directly for the present sound system. This low cost model gives the owner an enhanced sound system with multimedia capabilities, plus a portable radio/phone system. The computer module can be installed as an upgrade feature to provide full computer system functionality. For instance, the computer module supports the navigation, security, diagnostics, communications, and entertainment systems, as well as any other application that the vehicle owner would like to subsequently install; a standard expansion bus is part of the computer module. The expansion bus can be used for adding additional peripherals.

In another implementation, the vehicle computer system includes a centralized server located in the dashboard or elsewhere in the vehicle and remote client computers located at the passengers of the vehicle. The server is connected to retrieve data or programs from the storage device, such as the CD player, floppy diskette, or hard drive, and to download such information to the client computers over a data network arranged in the vehicle. In this manner, a passenger can operate a game application or watch a video from their seat in the car without interrupting the driver or other occupants.

In yet another application, a single computer module could drive two or more graphic displays using separate graphic controllers; thus displaying separate images such as a moving map for the driver on one display and entertainment or TV for the passenger on another display.

BRIEF DESCRIPTION OF THE DRAWINGS

The same reference numerals are used throughout the drawings to reference like components and features.

DETAILED DESCRIPTION OF THE PREFERRED EMBODIMENT

Figure 1:
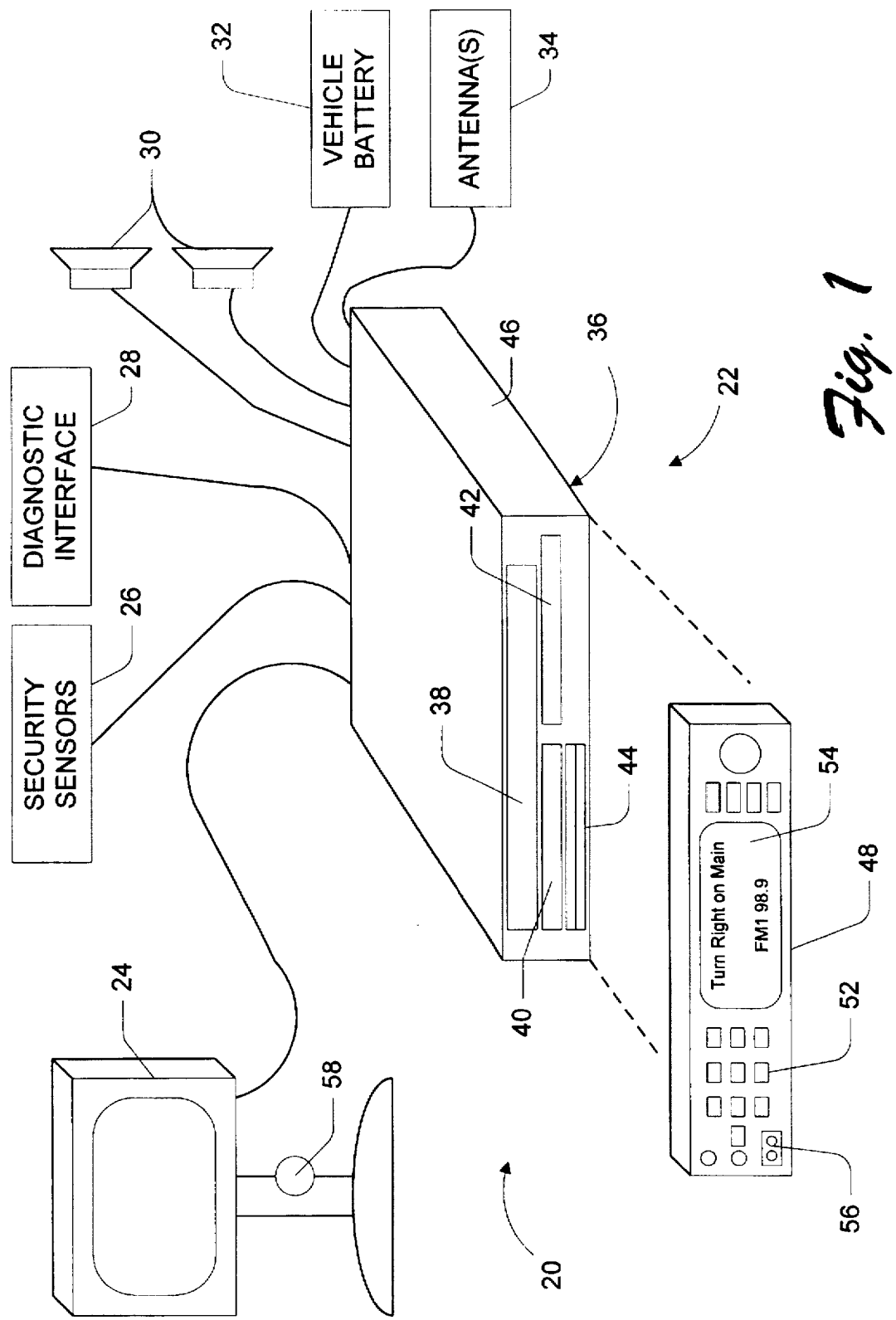
FIG. 1 is a diagrammatic illustration of a vehicle computer system.

FIG. 1 shows a vehicle computer system 20 according to one implementation of this invention. Vehicle computer system 20 has a centralized computer 22 coupled to various peripheral devices, including a monitor 24, security sensors 26, a vehicle diagnostic interface 28, speakers 30, vehicle battery 32, and antenna(s) 34. The computer 22 is assembled in a housing 36 that is sized to be mounted in a vehicle dashboard, similar to a conventional car stereo. Preferably, the housing 36 has a form factor of a single DIN (Deutsche Industry Normen). But, it possibly could be housed in a 2 DIN unit or other special form factor for an OEM.

The computer 22 runs an open platform operating system which supports multiple applications. Using an open platform operating system and an open computer system architecture, various software applications and hardware peripherals can be produced by independent vendors and subsequently installed by the vehicle user after purchase of the vehicle. This is advantageous in that the software applications do not need to be dedicated to specially designed embedded systems. The open hardware architecture is preferably running a multitasking operating system that employs a graphical user interface. One preferred operating system is a Windows® brand operating system sold by Microsoft Corporation, such as Windows 95® or Windows NT® or other derivative versions of Windows®. A multitasking operating system allows simultaneous execution of multiple applications.

The computer 22 includes at least one storage drive which permits the vehicle user to download programs and data from storage medium. In the illustrated implementation, the computer 22 has a CD ROM drive 38 which reads application-related CDs, as well as musical, video, game, or other types of entertainment CDs. In this manner, the CD ROM drive 38 performs a dual role of storage drive and entertainment player. Also, a hard disk drive (not shown in FIG. 1) is included on the computer module which can be used for storing both application programs and user data. The computer 22 has an optional 3.5" floppy diskette drive 40, a smart card reader 42, and dual PCMCIA card sockets 44 which accept PCMCIA card types II and III. Hereinafter, the acronym "PC-Card" will be used in place of the acronym "PCMCIA."

The storage drives are mounted in a stationary base unit 46 of housing 36. The base unit 46 is constructed and sized to be fixedly mounted in the dashboard. The housing 36 also has a faceplate 48 which is pivotally mounted to the front of the base unit 46. The faceplate can be rotated to permit easy and convenient access to the storage drives.

Figure 2:
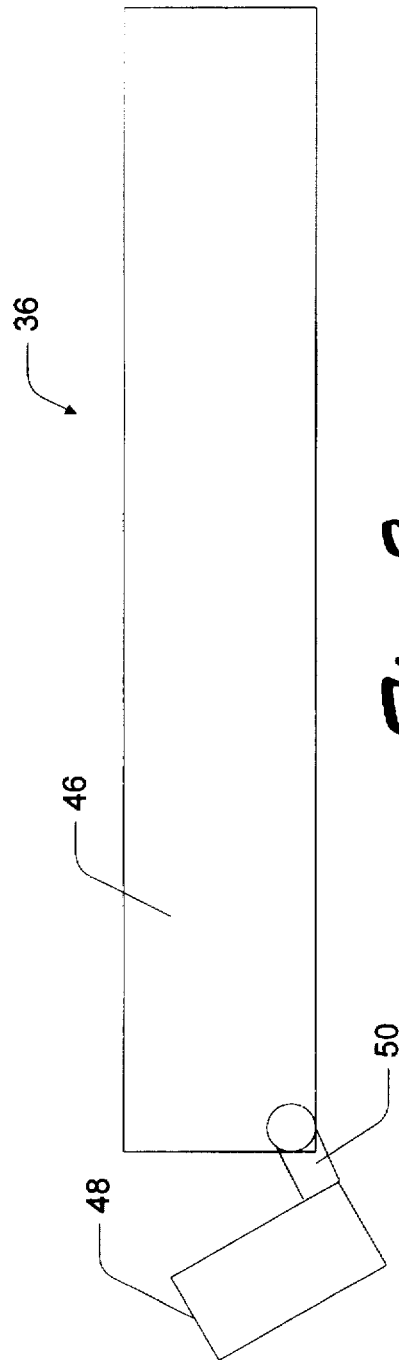
FIG. 2 is a diagrammatic side view of a base unit and detachable faceplate employed in the vehicle computer system.

FIG. 2 shows the housing 36 in more detail. Faceplate 48 has a physical coupling assembly 50 which enables the pivotal movement to alternately cover or expose the storage drives within the base unit 46. Additionally, the physical coupling assembly 50 enables the faceplate 48 to be attached to or detached from the base unit 46. This is represented in FIG. 1 in which the faceplate 48 is entirely detached from the base unit 46.

With reference again to FIG. 1, the computer 22 has a keypad 52 and a display 54 on the faceplate 48. The display 54 is preferably a back lit LCD. The operating system executing on the computer 22 controls the faceplate keys 52 and the faceplate display 54 as peripheral devices when the faceplate is attached to the base unit. Additionally, as will be described below in more detail, the computer has a voice recognition device situated on the faceplate to permit the user to verbally enter commands in a hands-free, eyes-free environment. These voice commands can be used for controlling most operating modes of the vehicle computing platform. The computer 22 is also equipped with an IrDA (infrared developers association) transceiver port 56 mounted on the faceplate 48 to transmit and receive data and programs using infrared signals. The entire faceplate unit 48 behaves as a multifunction peripheral to the computing platform.

To load an application or data onto the computer 22, the vehicle user inserts a CD or diskette, if the application is not already contained on the hard disk, into the appropriate drive and the operating system downloads the application or data therefrom. The installation process can be automatically handled by the operating system, or with the assistance of commands input from the user in the form of keyed sequences on the keypad 52 or verbal instructions using the voice recognition device. Another technique to load data or applications or transfer data with other computing devices is through the use of the IrDA transceiver port 56.

The computer 22 can output visual data to the LCD 54 at the faceplate, or to the standalone monitor 24. The monitor 24 is preferably a small flat panel display (e.g., 6.4" screen) that is movably mounted on a stand or yoke and remotely located from the computer. The monitor 24 is fully adjustable to different viewing positions that can be seen by the driver or other passengers in the vehicle. The type of data displayed on the monitor can range widely from word instructions concerning the vehicle's performance, to diagrammatic directions used by the navigation system, to video movies for in-car entertainment. The monitor 24 is equipped with an automatic override switch 58 which automatically disables the display of any non-driving related data when being viewed by the driver. In the event that the monitor is positioned for driver viewing, only information supportive and helpful to driving (e.g., diagnostics, navigation directions) is displayed on the monitor, while distracting information (e.g., video movies, games) are blocked from display. In one implementation, the switch is an electrical cylindrical switch which closes when the display is capable of being viewed by the driver; thus, the software can sense the display position and only allow permitted information to be displayed.

In general, the vehicle computer system 20 can be used to integrate multiple vehicle-related systems onto one open platform hardware and software architecture. For instance, the vehicle computer system 20 can serve as a multimedia entertainment system, a navigation system, a communications system, a security system, and a diagnostics system. Moreover, the vehicle computer system 20 provides additional functionality traditionally associated with desk-top and laptop personal computers. For instance, vehicle computer system 20 can support word processing applications, spreadsheet applications, database applications, and appointment/schedule applications. Furthermore, the vehicle computer system 20 can be configured to operate as a server to other computing units in the vehicle to distribute games, video movies, and the like to passengers.

Figure 3:
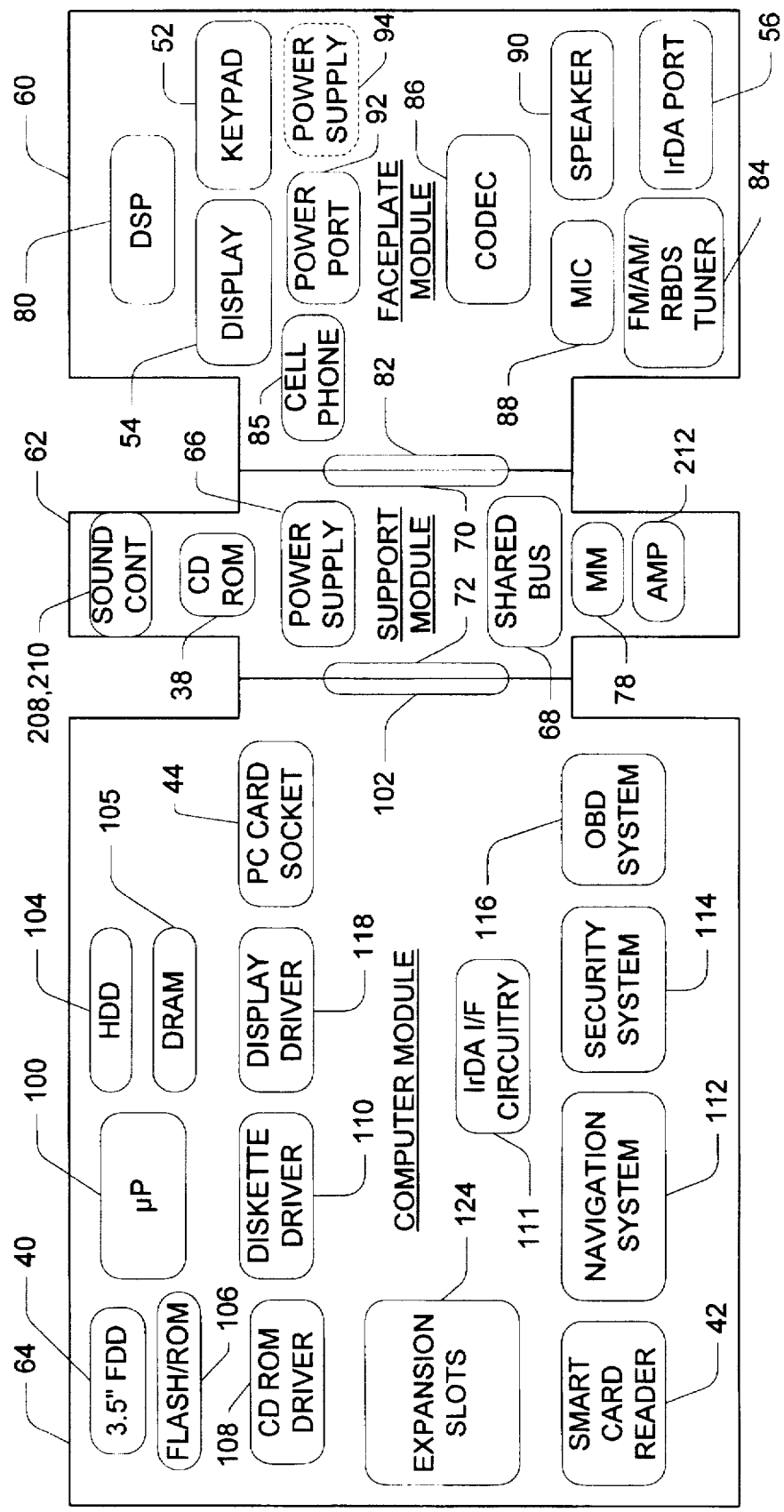
FIG. 3 is a block diagram of the vehicle computer system according to one implementation having a faceplate module, a support module, and a computer module.

FIG. 3 shows the computer 22 according to one implementation of the invention. Computer 22 has three primary modules: a faceplate module 60, a support module 62, and a computer module 64.

Support Module 62

The support module 62 resides in the stationary base unit 46 (FIG. 1) that is mounted in the vehicle dashboard. The support module 62 includes a power supply subsystem 66 and an internal bus 68 for the computer 22. The internal bus 68 has a first interfacing slot 70 and a second interfacing slot 72 which provide shared access to the bus from the faceplate module 60 and the computer module 64. The support module 62 also has the CD ROM player 38, a multimedia audio driver 78, audio amplifier, and sound control circuitry.

Figure 4:
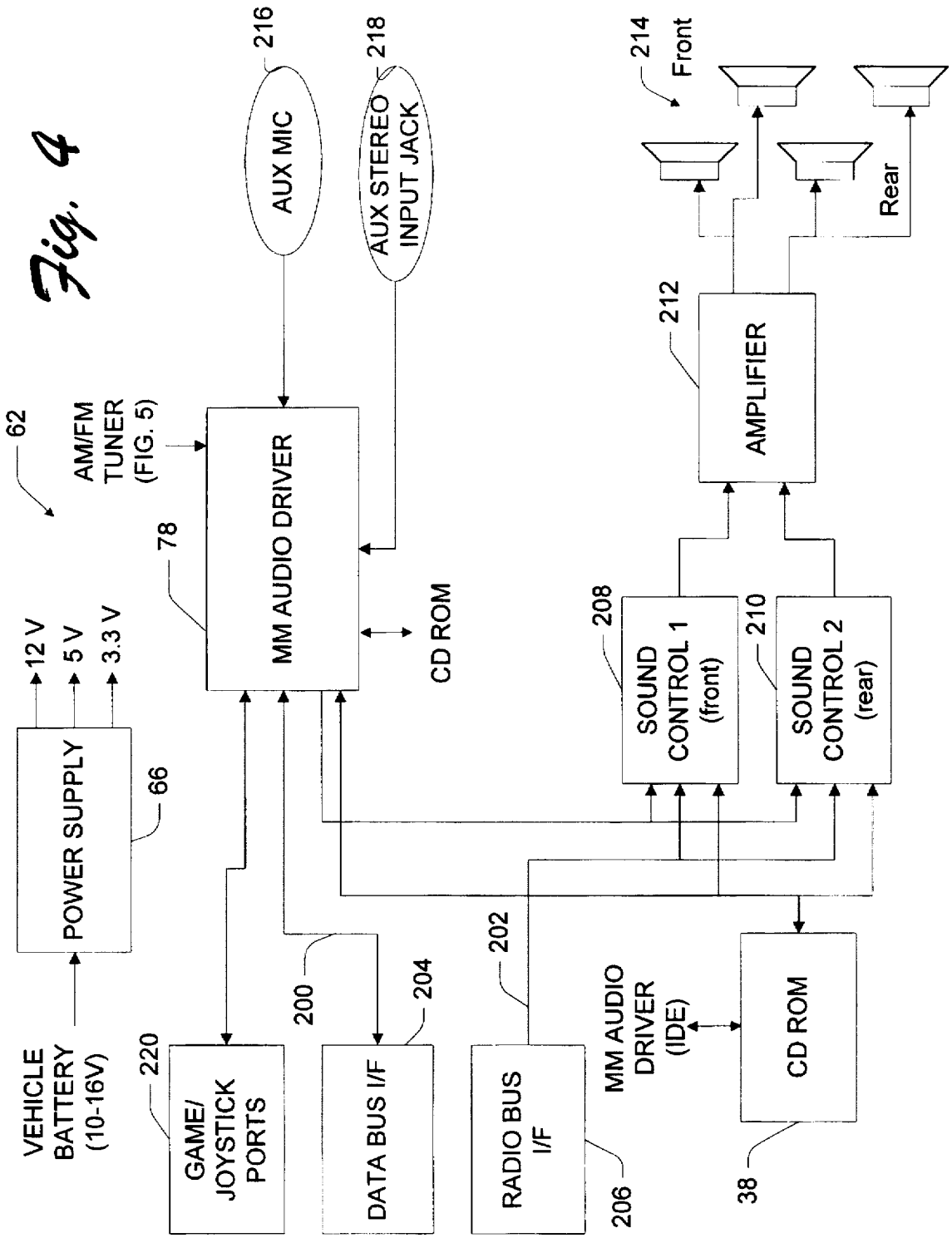
FIG. 4 is a functional block diagram of the support module.

FIG. 4 shows the support module in more detail. The power supply subsystem 66 derives power from the vehicle battery, and transforms the battery voltage level (e.g., 10–16 volts) to appropriate chip voltage levels (e.g., 3.3–5 volts) or to a voltage sufficient to run the CD player 38, diskette memory drive 40, hard disk drive, and other devices possibly requiring 12 volts. The internal bus 68 preferably comprises two separate buses: an data-related bus 200 (e.g., a PCI bus) and a radio-related bus 202 (e.g., an $I^2C$ bus). The first and second interfacing slots 70, 72 include the data bus interface 204 for bus 200 and the radio bus interface 206 for bus 202. The second interfacing slot also includes a power interface to supply power to the CPU module. For the faceplate module, however, vehicle power is taken directly from the vehicle battery and passed to the faceplate module, which has its own power regulation circuitry.

The multimedia audio driver 78 controls the audio sound system of the vehicle. It is coupled to control the CD ROM 76, and parallel sound controllers 208 and 210. The audio data coming out of the CD-ROM drive can be selected to feed the parallel sound controllers which control the volume, treble, bass, and balance for the front and rear speakers, respectively. The use of two sound control chips enables different audio sources to be selected and played in the front and rear of the vehicle. For example, the vehicle driver can listen to navigation instructions while the rear seat passengers can listen to their favorite tunes.

The audio signals are amplified by power amplifier 212 and converted to stereo sound by quad-speaker system 214. The multimedia audio drive 78 also supports an auxiliary microphone input 216, and an auxiliary stereo jack input 218 for attaching an external tape drive, portable tape player or some other external sound sources. A game/joystick port 220 is also provided in the support module 62 and coupled to the multimedia driver 78.

Faceplate Module 60

With reference to FIG. 3, the faceplate module 60 resides on the detachable faceplate 48 (FIG. 1). The faceplate module 60 includes a first processor in the form of a digital signal processor (DSP) 80, although other types of processors may be employed. The faceplate module 60 further includes an electrical interface 82 which compatibly couples to the first interfacing slot 70 on support module 62 to permit data communication between the faceplate module and the support module.

The faceplate module 60 is primarily dedicated to entertainment and communications. When the faceplate module is coupled to the support module, the DSP 80 uses the internal shared bus 68 on the support module 62 to control the CD player 38 via the multimedia audio chip 78 when playing musical or video CDs and the multimedia audio driver 78 to optimize sound and video quality. It should be noted that analog or digital cassette players, or other entertainment players, can be substituted for the CD player or added to the system.

The faceplate module 60 is also equipped with a radio tuner 84 which supports radio functionality. The radio tuner 84 includes an AM/FM tuner, RBDS demodulator, and decoder to recover information transmitted on the FM subcarrier programming. Additionally, a cellular telephone 85 or an RF transceiver can optionally be attached to the faceplate. The faceplate module 60 includes an audio analog to digital converter and digital to analog converter (or "CODEC") 86 that converts analog voice signals into data that can be sampled by the DSP 80. Also, the CODEC converts DSP sample data into analog signals that can drive a small loud speaker. The CODEC 86 in conjunction with the cellular phone 85 can be configured to provide full cellular phone functionality, independent of the computer module 64, or to operate as a remote handset that communicates with the computer module 64 or other phone. The CODEC 86 controls a microphone 88 to receive verbal input, and a speaker 90 to output voice. A power port 92 is also provided on the faceplate module 60 to enable use of an external power source (e.g., cellular battery pack 94) when the faceplate module is physically detached from the base unit or to regulate the vehicle battery voltage when attached to the base unit.

Figure 5:
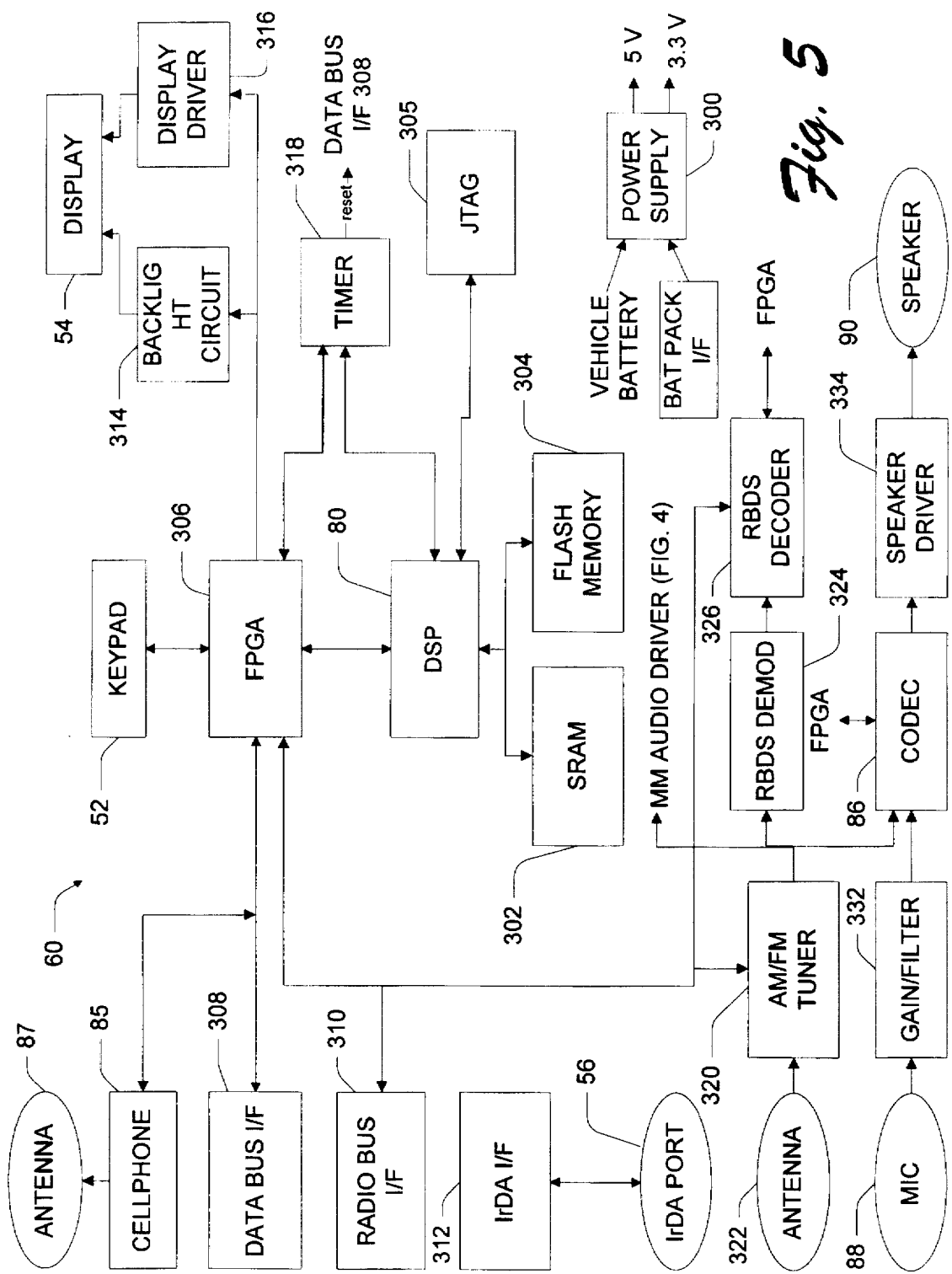
FIG. 5 is a functional block diagram of the faceplate module.

FIG. 5 shows the faceplate module 60 in more detail. It has its own power supply subsystem 300 which receives power from either the vehicle battery or from a battery pack in the event that the faceplate module is detached from the base unit. The faceplate power supply subsystem 300 transforms the input voltage level to a suitable chip voltage level of 3.3 volts or 5 volts.

The DSP 80 has an SRAM 302 for data storage and buffering and a flash memory 304 for program and voice template storage. This flash memory can be updated via the data bus and JTAG (Joint Test Action Group) port 305. Using the voice template in the flash memory 304, the DSP 80 operates in conjunction with the CODEC 86 as a voice recognition device that records and analyzes voice commands in relation to the stored voice template to determine and execute verbal instructions. In some cases the request will need to be sent to the CPU module if present.

The DSP 80 is coupled to a field programmable gate array (FPGA) 306 which coordinates data flow on the faceplate module. The FPGA 306 is coupled to the data bus interface 308 and the radio bus interface 310 which form part of the electrical interface 82 that connects to the first interfacing slot 70 of the support module 62. The data bus interface 308 also provides connection to any internal components embedded in the faceplate module 60, such as the cellphone chipset 85. The faceplate module 60 also has an IrDA interface port 312 coupled to the IrDA port 56 to convey the data to the computer module 64, as described below. This IrDA interface 312 is also part of the electrical interface 82.

The DSP 80 further controls the keypad 52 and display 54 via the FPGA 306. The DSP 80 scans and interprets inputs from the keypad 52. The input data can be acted upon by the DSP 80 or sent to the computer module 64 via the data bus interface 308. The display 54 is preferably a back lit LCD, driven by a backlight circuit 314 and a display driver 316. The display is memory mapped to an I/O space in the DSP 80 for direct control by the DSP. Additionally, the computer module 64 can send commands to the DSP to indirectly control the display resources and other DSP controlled resources. A watchdog timer 318 is contained on the faceplate module gets periodically reset by the DSP. If the DSP fails to reset this timer, then something is hung and all resources on all three modules are reset and the unit recovers to a default state.

The faceplate module has an AM/FM tuner 320 connected to receive an RF signal from an antenna 322. The antenna 322 can be the vehicle antenna, or a separate remote antenna that is used by the faceplate module when detached from the base unit. The RF signal received at the tuner 320 is demodulated by a demodulator 324 to retrieve the information signal from the carrier signal. The information signal is then decoded by a decoder 326 and passed to the DSP 80 via the FPGA 306. It is noted that the decoding function performed by decoder 326 can alternatively be performed by logic contained in the FPGA 306. The DSP passes the radio signal over the data bus interface 308 to the multimedia audio driver in the support module 62 to be played over the sound system in high quality, stereo sound.

A separate mono CODEC 86 is also coupled to receive analog sound signals from the microphone 322 or tuner 320. The CODEC 86 in conjunction with the microphone 88, speaker 90, and cellphone or RF transceiver provides telecommunications functionality in the faceplate module. A gain/filter 332 and a speaker driver 334 associated with the CODEC 86 are optimized to provide premium voice recognition and playback for use against vehicle and environmental noise. The CODEC 86 can also be used to supply voice commands to the DSP 80 via FPGA 306. The DSP 80 is programmed to recognize certain voice commands using a voice template stored in the flash memory 304.

Figure 6:
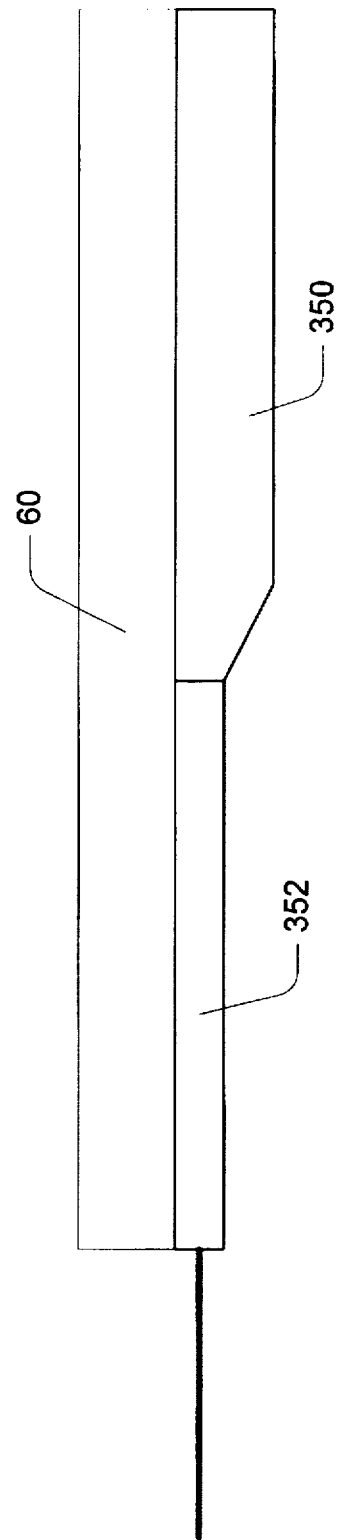
FIG. 6 is a diagrammatic side view of the faceplate operating as a communications device while detached from the base unit of the vehicle computer system.

The faceplate module 60 can be disconnected from the base unit and employed as a portable RF device for both radio reception and telecommunications with the optional cellphone module or RF transceiver module. As shown in FIG. 5, the cellphone module 85 is connected to the data bus I/F 308 and to an antenna 87 to provide telecommunications. FIG. 6 shows the faceplate module 60 detached from the base unit and coupled to a conventional cellular battery pack 350 and a cellular phone RF transceiver and antenna unit 352. The faceplate module 60 can play monosound radio using the speaker 90, and provide telecommunications directly to a cellular network, or indirectly through the base unit. Additionally, the portable RF device can provide support for features like paging, voice recording, and voice dialing.

Computer Module 64

The computer module 64 may reside in the dashboard-mounted base unit 46 or in a separate location and includes a second processor in the form of a microprocessor 100, such as an Intel® 486 microprocessor. The computer module 64 is configured as a plug-in motherboard having an electrical interface 402, which compatibly couples to the second interfacing slot 72 on support module 62. When plugged in, the computer module 64 has access to the internal shared bus 68. In this manner, the faceplate module 60, support module 62, and computer module 64 all share the same internal bus 68 to communicate with one another. The computer module 64 derives power from power supply subsystem 66 on the support module 62.

The microprocessor 100 runs an open platform operating system, such Windows 95® or Windows NT® or other Windows® derivative operating systems from Microsoft Corporation. The operating system is stored in a hard disk drive 104 (e.g., >200 Mbytes). The computer module 64 supports any variety of applications that the vehicle user might desire. These applications can also be stored on the hard disk drive 104 or on a removable storage medium, such as a CD ROM, cassette, CD changer, or floppy diskette. A DRAM 105 (e.g., 8 Mbytes) and flash memory 106 (e.g., 512 Kbytes) are employed in the computer module to support the microprocessor 100 in running the operating system and loaded applications.

When the user wishes to install a program on the computer module 64, he/she inserts a floppy diskette into the floppy disk drive 40 or a CD ROM into the CD drive 38. The operating system senses the new storage device and initiates the install procedures. BIOS extensions are stored with the operating system to enable booting from the CD ROM or floppy disk drive (FDD). The computer module 64 has a CD ROM driver 108 and diskette driver 110 to control the CD player 38 or diskette drive 40, respectively, during this read operation. If contained on the CD, the program data is transferred from the CD ROM drive 38 through the MM chip 78 to bus 68 on the support module 62, and then over the interface coupling 72/102 to the microprocessor 100 and RAM 106 on the computer module 64. If the data is contained on the floppy disk, then the data is transferred directly through the FDD interface contained on the computer module. As noted above, data can also be input via the IrDA port 56 on the faceplate. Such data is transferred via the faceplate/support coupling 70/82, the shared bus 68 (or separate conductor), and the support/computer coupling 72/102 to the IrDA interface circuitry 111 contained on the computer module.

The computer module 64 has a navigation system 112 which includes both a GPS (global positioning system) receiver and a map application, such as Automap™, a program produced by Microsoft Corporation. A security system 114 is provided in the computer module 64 to manage vehicle security. The security system 114 monitors the security sensors 26 (FIG. 1) for any potential threat of theft or vandalism. The security system 114 is connected to actuators which lock/unlock doors and windows, and to an alarm which can be activated upon detection of unwanted tampering.

An OBD (On Board Diagnostic) interpreter 116 is provided in the computer module to communicate with the OBD system built into the vehicle by the manufacturer. The OBD interpreter 116 interprets the status data received and provides performance related information from the vehicle's OBD system to the microprocessor 100. Also, commands can be provided to the interpreter which allows non-critical car systems to be controlled.

The computer module 64 also includes at least one flat panel display controller 118 to control the flat panel monitor 24. A dual PC card socket 44 is provided to support 2-type II or 1-type III PC cards. Such cards might be configured as extra memory, modems, network adapters, or other components. The computer module 64 also has a smart card reader 42 which accepts smart cards (i.e., plastic cards with an integrated circuit mounted thereon). The smart cards can be programmed as a key to the vehicle, to contain encrypted driver identification that the security system uses to authenticate the driver before the vehicle can be started, and be programmed to remember vehicle driver configuration profiles. In the event the microprocessor does not recognize the identification on the smart card, the security system can activate the alarm or take other precautionary measures to prevent theft by unauthorized users. For added security, a driver might also be asked to input a PIN (personal identification number) using the keypad 52 on the faceplate.

The computer module also includes expansion slots 124 to support a variety of peripheral devices. For instance, the computer module 64 can support additional peripherals via the expansion slots such as a universal serial bus, analog I/O, an RF transceiver, a cellular phone/modem, a display, a tape player, an MPEG video/audio decoder, a TV tuner, a gyroscope, a keyboard, a mouse, a joystick, and a docking station.

Figure 7:
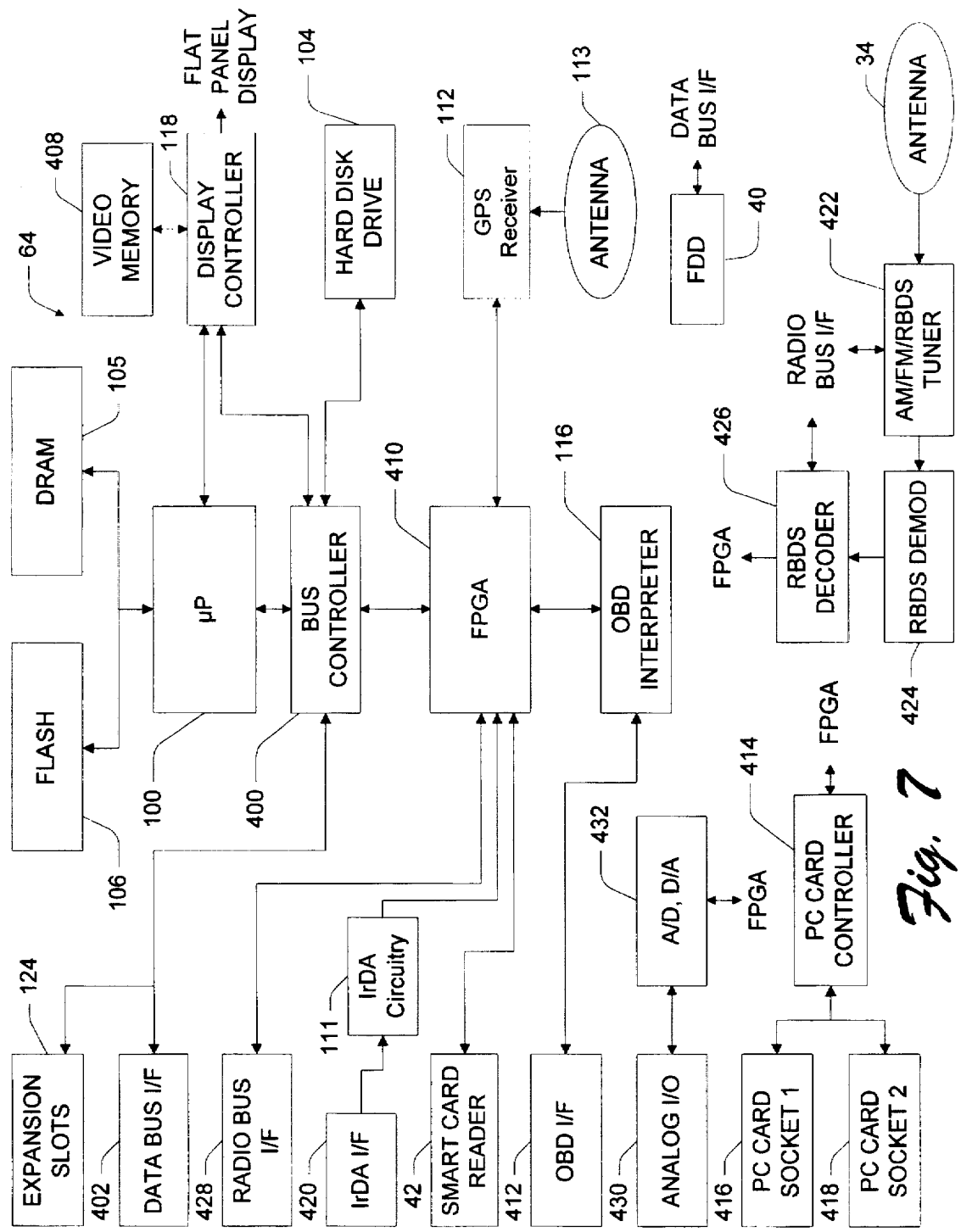
FIG. 7 is a functional block diagram of the computer module.

FIG. 7 shows the computer module 64 in more detail. The microprocessor 100 is coupled to a bus controller 400, such as an PCI bus controller. The bus controller 400 is attached to the data bus interface 402 and the expansion slots 124. Additionally, the bus controller 400 directly supports the hard disk drive 104. A DRAM 105 (e.g., 8 Mbytes) and a flash memory 106 (e.g., 512 Kbytes) provide data and caching storage for the microprocessor. The microprocessor 100 manages the flat panel display controller 118 with video memory 408 (e.g., 512 Kbytes) to output visual display data received from bus controller 400 to the flat panel display 24 (FIG. 1).

An FPGA 410 is connected to the bus controller 400 and is controlled by the microprocessor 100. The FPGA 410 is connected to the navigation system 112 and the OBD interpreter 116. The GPS receiver 112 is connected to GPS antenna 113 to receive RF signals from the satellite-based GPS. The GPS antenna 113 is separate from the AM/FM antenna 322 (FIG. 5) and the cellphone antenna 87 (FIG. 5) because of the different wavelengths. However, in another implementation, the GPS antenna 113 and the cellphone antenna 87 can be packaged as two antenna elements in one enclosure. The navigation system 112 can be implemented using a GPS chipset manufactured by Trimble Navigation, Rockwell International, Phillips Semiconductor or others. The OBD interpreter 116 is connected to an OBD interface 412 that interconnects to the vehicle manufacturer's diagnostic system.

The bus controller 400 supports a PC card controller 414 which manages two PC card sockets 416 and 418. The first PC card socket 416 accepts a type II PC card when no type III card is present in the second slot, and the second PC card socket 418 accepts either a type II or type III PC card. The FPGA 410 is further connected to a smart card reader 42, and to an IrDA interface 420 via IrDA circuitry 111. The IrDA interface 420 is coupled to receive or transmit data via infrared signals using the IrDA port 56 on the faceplate. The FPGA has a DUART or other serial-to-parallel converter to perform rudimentary conversion of the serial data stream received from the smart card or infrared carrier signal to a data set usable by the microprocessor.

The computer module 64 is equipped with a second radio receiver unit consisting of an AM/FM tuner 422 connected to receive an RF signal from antenna 34, a demodulator 424, and a decoder 426. The second radio receiver unit can be used to receive radio signals for timed recording of radio programming for later playback. Additionally, the second radio receiver can be tuned to receive both the FM subcarrier and audio programming of the primary FM channel. Such FM subcarrier might carry weather, news, sports, financial, traffic, paging, or other information. With two radio receiver units (i.e., one in the faceplate module and one in the computer module), the computer system can receive both the primary channel and the subchannels concurrently. A radio bus interface 428 is used to connect the second radio receiver unit to the FPGA (410) which then converts the data to digital data to be transmitted over the data bus (e.g., PCI bus) to the multimedia audio driver and sound system on the support module 62.

An analog I/O 430 and converters 432 are optionally provided on the computer module 64 to provide an analog input port to the computer and are used to interface to the security system. The security sensors 26 (FIG. 1) are connected to analog inputs 430, while the actuators which lock/unlock doors and windows and an alarm are driven by analog outputs 430.

The modular vehicle computer system described herein offers a unique flexibility to be customarily configured according to the tastes and preferences of each vehicle owner. There are three primary configurations of the modular vehicle computer system: a portable RF device, an entertainment/communication system, and a fully operable computer system that supports communications and entertainment.

Configuration 1: Portable RF Device

In this first configuration, the faceplate module 60 is physically detached from the base unit and electrically disconnected from the support module interface slot 70 to operate as a portable RF electronics device. In this mode, the faceplate module 60 functions as a portable radio unit with monosound via the single speaker 90. The faceplate module 60 can also function as a portable telecommunications device using the CODEC 86, microphone 88, and speaker 90 for voice input/output, and the keypad 52 or voice to dial numbers. Additionally, by virtue of the RF receiver and using the RBDS information over the FM subcarrier, the faceplate module can function as a pager to receive messages that can be stored as voice notes, or displayed on the LCD 54. Also, voice can be recorded by the user and stored in the flash memory of the faceplate.

Configuration 2: Vehicle Entertainment/Communication System

In this second configuration, the faceplate module 60 is attached to the base unit and electrically connected to the interface slot 70 to communicate with the support module 62. However, the computer module is removed from the base unit. In this arrangement, the double module unit functions as an entertainment/communications system in that it provides all of the functionality of conventional car stereo systems while optionally integrating telecommunication functionality. The DSP 80 in the faceplate module 60 controls the AM/FM radio, the CD ROM drive, and the multimedia audio drive. The vehicle user can play CDs or tune to a favorite radio station and listen to high quality, stereo sound. Additionally, the user can receive and initiate telephone calls, receive pages, or record voice notes in the same manner as the portable faceplate module. One added convenience is that all of these features are voice activated to maintain a hands-free, eyes-free driving environment.

Configuration 3: Full Computer System

In the third configuration, both the faceplate module 60 and the computer module 64 are coupled to the support module. The triple module arrangement forms the full computer system capable of supporting a wide range of applications (e.g., navigation, security, diagnostics) as well as communications. Additionally, the tri-module configuration provides an enhanced entertainment system that offers both audio and video, as well as a second tuner to receive financial, weather, and other news in the FM sub carriers via RBDS.

When both processing modules are connected to the support module, the microprocessor 100 on the computer module 64 operates as the master processor with full control of the shared bus 68 and resources. The DSP 80 in the faceplate module functions as a slave processor. This hierarchy is established simply by plugging the computer module into the support module which places the DSP in a slave mode. The DSP is relegated to audio signal processing for enhanced stereo sound, scanning the keypad 52, exporting visual data to the LCD 54, controlling the faceplate tuner and performing voice recognition. As a result, the faceplate module 60 is treated as a peripheral device on the shared bus 68 that is controlled by the computer module 64, whereby the keypad 52, LCD 54, communications CODEC 86, and faceplate tuner serve as I/O peripherals accessed via registers in the faceplate FPGA.

The faceplate module 60 can be removed while the computer module 64 is powered up. With the loss of these peripherals, the computer module 64 loses some functionality and some DSP enhanced audio qualities. However, the computer module 64 still supports many applications, including security, diagnostics, navigation, paging, and others.

It is further noted that the complete vehicle computer system can be removed from the base unit for security reasons, or to plug the computer into a docking station at the user's residence or office. With a docking station, the user can install or configure various programs for vehicle usage, or simply use the computer module as a portable computer.

System Software

As noted above, the vehicle computer system runs an open platform operating system, such as Windows 95®, Windows NT®, or Windows® derivative. There are several applications that are supported by the operating system. These applications include a navigation application, a security application, a radio-on-demand application (program recording and playback based on radio program attribute such as time or content), a paging application, and a faceplate user interface. The applications can be stored on the hard disk drive, or on CD ROMs that are inserted into the CD ROM drive.

The vehicle computer system also implements several application program interfaces (APIs) that offer specific functionality to support the various applications. Example APIs include a position and navigation API, a smart card and cryptography API, a diagnostics API, radio/TV tuner API, and analog I/O API.

These applications and APIs are vehicle related. Other applications which are unrelated to vehicles can also be loaded onto the computer. Such applications might include a banking/financial application, such as Money™ from Microsoft Corporation, to assist the user in banking while on the road. There might also be video applications that facilitate display of in-car video movies or games. Essentially, the vehicle computer system can support any applications that run on the open platform operating system, which are many and varied.

Vehicle Network

Figure 8:
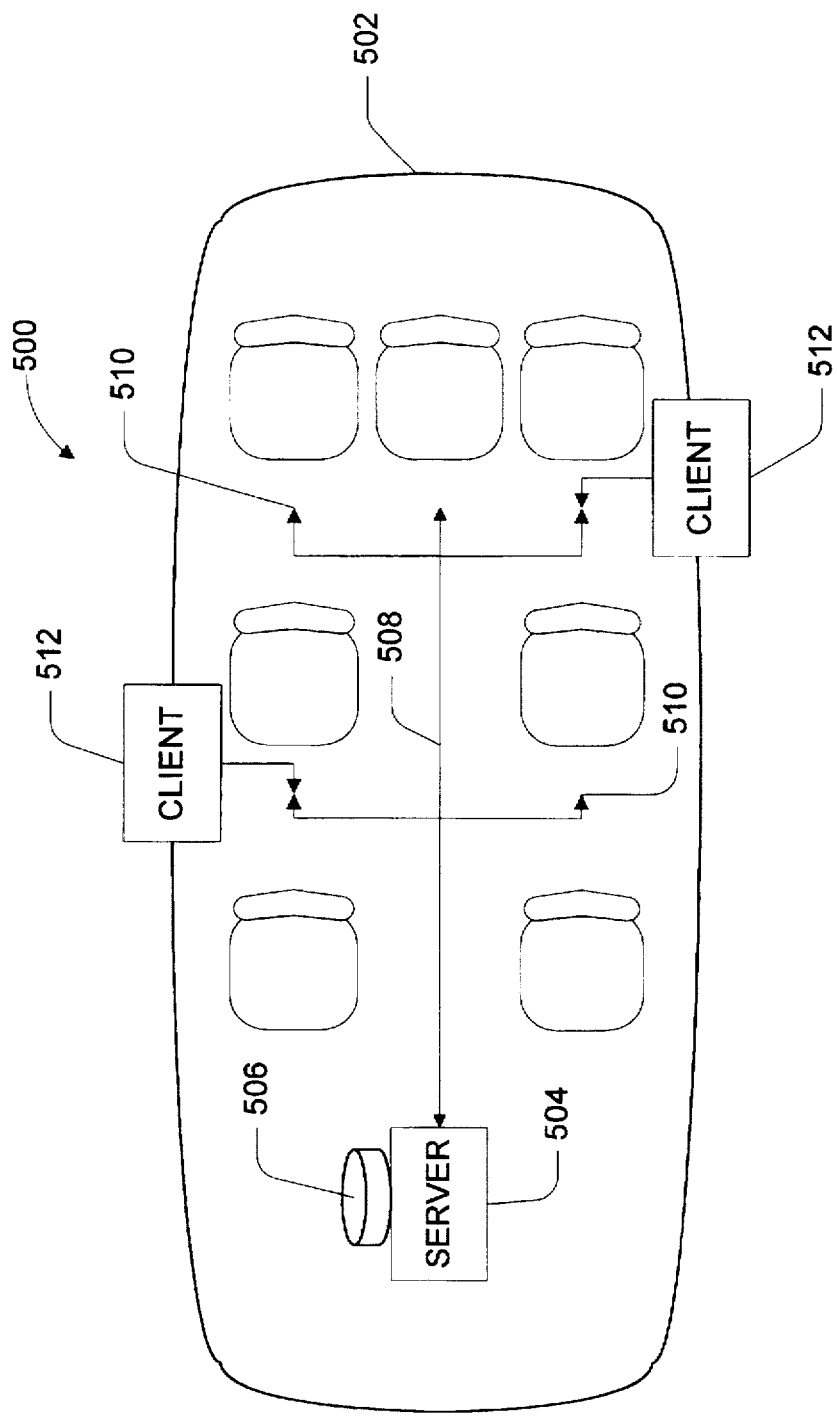
FIG. 8 is a diagrammatic illustration of the vehicle computer system according to another embodiment having a centralized server computing unit and one or more client computing units distributed on a data network in a vehicle.

FIG. 8 shows a vehicle computer network system 500 designed for a vehicle 502. In this example illustration, the vehicle 502 is a minivan or sport utility vehicle which seats seven occupants. The system 500 has a server computing unit 504 which is mounted in a first location of the vehicle 502. Preferably, this server computing unit 504 is implemented as computer 22 described above and mounted in the vehicle dashboard or other suitable location. The server computing unit 504 runs a server operating system, such as Windows NT®.

A mass storage device or database 506 is provided at the server computing unit 504 to store data. In one implementation, the storage device 506 comprises data and programs stored on a CD that can be read using the CD ROM drive of the server computing unit. Alternatively, the storage device 504 can be implemented as a hard disk drive or a tape storage.

A data network 508 is arranged throughout the vehicle 502 to provide connection ports at various locations remote from the server computing unit 504. Here, connection ports 510 are provided at each of the rear five passenger seats.

The vehicle computer network system 500 has one or more client processing units 512 equipped with a compatible interface adapter for the network connection port 510. Once connected to the network, the client processing unit 512 can receive data and programs from the central storage device 506 via server computing unit 504. The client processing unit 512 preferably has a visual display screen and audio sound card to provide multimedia entertainment.

According to this arrangement, the server computing unit 504 can provide in-car entertainment to passengers. For instance, a movie can be shown to a passenger by inserting a video disk into the CD ROM drive 506 at the server computing unit 504. The central computing unit becomes a video server distributing video over the data network 508 to the client processing units 512. Other types of entertainment include games and music.

The network system can be configured to be interactive in which the client computing units 512 can request certain entertainment from the server computing unit 504. For example, suppose a game CD having multiple games is loaded in the CD ROM drive. One passenger wants to play an combat video game, while another passenger wishes to play computer chess. Each client computing unit can request the appropriate game from the server computing unit 504, which retrieves the games and distributes them to the requesting client computing units.

In compliance with the statute, the invention has been described in language more or less specific as to structure and method features. It is to be understood, however, that the invention is not limited to the specific features described, since the means herein disclosed comprise exemplary forms of putting the invention into effect. The invention is, therefore, claimed in any of its forms or modifications within the proper scope of the appended claims appropriately interpreted in accordance with the doctrine of equivalents and other applicable judicial doctrines.

We claim:

1. A vehicle computer system comprising:
   a housing of a size suitable to be mounted in a vehicle dashboard;
   a computer mounted within the housing;
   an open platform operating system executing on the computer, the operating system being configured to support multiple applications that are supplied by a vehicle user;
   a faceplate attached to the housing; and
   a peripheral device contained in the faceplate and compatibly connected to the computer, the operating system managing the peripheral device.

2. A vehicle computer system as recited in claim 4 further comprising:
   a removable storage medium that stores individual ones of the applications; and
   the computer having a storage drive that compatibly reads the storage medium to load the individual applications from the storage medium to the computer.

3. A vehicle computer system as recited in claim 4 wherein the operating system is a multitasking operating system that is capable of concurrently running the multiple applications.

4. A vehicle computer system as recited in claim 1 wherein the peripheral device is a display.

5. A vehicle computer system as recited in claim 1 wherein the peripheral device is an input mechanism.

6. A vehicle computer system as recited in claim 1 wherein the applications supported by the operating system are selected from a group comprising a navigational application, an entertainment application, a communications application, a vehicle security application, and a vehicle diagnostics application.

7. A vehicle computer system as recited in claim 1 wherein the housing has a form factor of a single DIN.

8. A vehicle computer system as recited in claim 1 further comprising a data network connected to the computer, the data network having at least one connection interface provided at a location remote from the vehicle dashboard.

9. A vehicle computer system as recited in claim 8 further comprising at least one client processing unit having a network port to compatibly couple to the connection interface of the data network.

10. A vehicle computer system comprising:
    a housing of a size suitable to be mounted in a vehicle dashboard, the housing having first and second support structures that can be physically connected to, or separated from, one another;
    a first processing unit mounted to the first support structure of the housing to provide first processing and control capabilities;
    a second processing unit mounted to the second support structure of the housing to provide second processing and control capabilities;
    a busing subsystem to electrically interconnect the first and second processing units when the first and second support structures are physically connected to one another; and
    the first processing unit, the second processing unit, and the busing subsystem being arranged within the housing so that the vehicle computer system conforms to a form factor for mounting in the vehicle dashboard.

11. A vehicle computer system as recited in claim 10 wherein
    the second support structure is a base unit constructed for physical mounting in the vehicle dashboard; and
    the first support structure is a detachable faceplate that can be attached to or detached from the base unit.

12. An vehicle computer system as recited in claim 10 wherein:
    the first processing unit is a digital signal processor; and
    the second processing unit is microprocessor.

13. A vehicle computer system as recited in claim 10 further comprising a data network connected to the second processing unit, the data network having at least one connection interface provided at a location remote from the vehicle dashboard.

14. A vehicle computer system as recited in claim 13 further comprising at least one client processing unit having a network port to compatibly couple to the connection interface of the data network.

15. An vehicle computer system comprising:
    a housing having a base unit and a faceplate;
    a support module mounted to the base unit, the support module having a communications bus and first and second interfacing slots to provide access to the communications bus;
    a first processor mounted to the faceplate to form a faceplate module, the faceplate module being compatibly connected to the first interfacing slot of the support module;
    a computer module having a second processor, the computer module being compatibly connected to the second interfacing slot of the support module; and
    the communications bus electronically interconnecting the faceplate module, the computer module, and the support module.

16. A vehicle computer system as recited in claim 15 wherein the housing has a form factor of a single DIN.

17. A vehicle computer system as recited in claim 15 wherein the computer module has an open platform operating system executing on the second processor, the operating system being configured to support multiple applications that are supplied by a vehicle user.

18. A vehicle computer system as recited in claim 15 wherein the faceplate module is controlled as a peripheral device by the computer module.

19. A vehicle computer system as recited in claim 15 further comprising an input device provided on the faceplate module that is electrically coupled as a peripheral to the computer module.

20. A vehicle computer system as recited in claim 15 further comprising an output device provided on the faceplate module that is electrically coupled as a peripheral to the computer module.

21. A vehicle computer system as recited in claim 15 further comprising a storage drive mounted in the housing, the storage drive reading information stored on a compatible storage medium to load the information into the computer module.

22. A vehicle computer system as recited in claim 15 further comprising a graphical display monitor separate and remotely located from the housing, but electrically coupled as a peripheral to the computer module.

23. A vehicle computer system as recited in claim 15 further comprising:
a first radio tuner provided in the faceplate module; and
a second radio turner provided in the computer module.

24. A vehicle computer system as recited in claim 15 wherein the faceplate module includes a voice recognition device to receive verbal commands from a user.

25. A vehicle computer system as recited in claim 15 wherein the faceplate module includes a speech generation device to produce verbal commands.

26. A vehicle computer system as recited in claim 15 wherein the faceplate module is physically detachable from the housing, the faceplate module being disconnected from the first interfacing slot when the faceplate module is physically detached form the housing, the faceplate module having an RF receiver and being operable as a portable RF receiving device to receive RF signals when the faceplate module is detached from the housing.

27. A vehicle computer system as recited in claim 15 wherein the faceplate module includes a microphone and speaker.

28. A vehicle computer system as recited in claim 15 wherein the faceplate module is physically detachable from the housing, the faceplate module being disconnected from the first interfacing slot when the faceplate module is physically detached form the housing, the faceplate module having a communications transceiver and being operable as a portable wireless communications device.

29. A vehicle computer system as recited in claim 15 wherein the computer module can be disconnected from the second interfacing slot and removed from the housing.

30. A vehicle computer system as recited in claim 15 further comprising a data network connected to the computer module, the data network having at least one connection interface provided at a location remote from the vehicle dashboard.

31. A vehicle computer system as recited in claim 30 further comprising at least one client processing unit having a network port to compatibly couple to the connection interface of the data network.

32. A vehicle entertainment/communication system comprising:

a base unit of a size suitable to be mounted in a vehicle dashboard;
a faceplate detachably connected to the base unit;
an entertainment player;
a processor mounted to the faceplate to form a faceplate module, the processor being configured to control the entertainment player when the faceplate module is attached to the base unit; and
an RF receiver provided in the faceplate module and operatively coupled to the processor, the faceplate module being operable as a portable RF receiving device to receive RF signals when the faceplate module is detached from the base unit.

33. A vehicle entertainment/communication system as recited in claim 32 wherein the faceplate module has a power connector to enable use of an external power source when the faceplate module is detached from the base unit.

34. A vehicle entertainment/communication system as recited in claim 32 wherein the faceplate module has a communications transceiver and the faceplate module is operable as a portable wireless communications device when the faceplate module is detached from the base unit.

35. A vehicle entertainment/communication system as recited in claim 32 further comprising first and second compatible transceivers, the first transceiver being located in the base unit and the second transceiver being located in the faceplate module, the faceplate module being operable to communicate with the base unit when the faceplate module is detached from the base unit.

36. A vehicle computer system comprising:
a housing of a size suitable to be mounted in a vehicle dashboard;
a computer mounted within the housing;
a graphical display monitor separate and remotely located from the housing, but electrically coupled as a peripheral to the computer, the computer controlling graphical data output to the graphical display monitor; and
the graphical display monitor having an automatic override switch that is activated when the display is viewable by the driver to prevent display of non-driving related information.

37. A vehicle computer system as recited in claim 36 wherein the graphical display monitor is a flat panel display.

38. A vehicle computer system as recited in claim 36 further comprising an open platform operating system executing on the computer, the operating system being configured to support multiple applications that are supplied by a vehicle user.

39. A vehicle computer system as recited in claim 36 wherein the housing has a form factor of a single DIN.

40. A vehicle computer system as recited in claim 36 further comprising a data network connected to the computer, the data network having at least one connection interface provided at a location remote from the vehicle dashboard.

41. A vehicle computer system as recited in claim 40 further comprising at least one client processing unit having a network port to compatibly couple to the connection interface of the data network.

42. A portable RF electronics device for use in conjunction with a vehicle entertainment system, the vehicle entertainment system having a base unit sized to be mounted in a vehicle dashboard and a player mounted in the base unit, the portable RF electronics device comprising:
a faceplate having a physical coupling assembly which enables the faceplate to be attached to or detached from the base unit of the vehicle entertainment system;

a processor mounted to the faceplate to form a faceplate module, the faceplate module having an electrical interface which compatibly couples to an interface on the base unit to permit data communication from the faceplate module to the player, the processor being configured to control the player device when the faceplate module is electrically coupled to the base unit; and an RF receiver provided in the faceplate module and operatively coupled to the processor, the faceplate module being operable as a portable RF receiving device to receive RF signals when the faceplate module is physically detached from the base unit.

43. A portable RF electronics device as recited in claim 42 further comprising a power connector to enable use of an external power source when the faceplate module is physically detached from the base unit.

44. A portable RF electronics device as recited in claim 42 further comprising a CODEC provided in the faceplate module to enable portable wireless communications when the faceplate module is physically detached from the base unit.

45. A portable RF electronics device as recited in claim 42 further comprising a voice recognition device provided in the faceplate module to receive verbal commands from a user.

46. A portable RF electronics device as recited in claim 42 further comprising an AM/FM/RBDS tuner provided in the faceplate module.

* * * * *